United States Patent
Lin et al.

(10) Patent No.: US 11,284,387 B2
(45) Date of Patent: Mar. 22, 2022

(54) METHODS AND SYSTEM FOR DEVICE-TO-DEVICE COMMUNICATION

(71) Applicant: NEC CORPORATION, Tokyo (JP)

(72) Inventors: Huei-Ming Lin, Victoria (AU); Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 16/333,288

(22) PCT Filed: Mar. 22, 2017

(86) PCT No.: PCT/JP2017/011295
§ 371 (c)(1),
(2) Date: Mar. 14, 2019

(87) PCT Pub. No.: WO2018/055813
PCT Pub. Date: Mar. 29, 2018

(65) Prior Publication Data
US 2019/0246385 A1 Aug. 8, 2019

(30) Foreign Application Priority Data
Sep. 26, 2016 (AU) ............... 2016903889

(51) Int. Cl.
*H04W 72/04* (2009.01)
*H04L 5/00* (2006.01)
(Continued)

(52) U.S. Cl.
CPC .......... *H04W 72/044* (2013.01); *H04L 5/003* (2013.01); *H04L 5/0007* (2013.01);
(Continued)

(58) Field of Classification Search
None
See application file for complete search history.

(56) References Cited

U.S. PATENT DOCUMENTS 10,225,847 B2 * 3/2019 Chae ................ H04W 72/1247
10,827,500 B2 * 11/2020 Chae .................... H04W 4/026
(Continued)

FOREIGN PATENT DOCUMENTS

WO 2015/142066 A1 9/2015
WO 2016/009480 A1 1/2016
(Continued)

OTHER PUBLICATIONS

"Discussion on Resource Pool for PC5 based V2V Communications", 3GPP TSG-RAN WG1 Meeting #86, R1-167357, NTT DOCOMO, Aug. 22-26, 2016, 6 pages, Gothenburg, Sweden.
(Continued)

*Primary Examiner* — Christopher T Wyllie
(74) *Attorney, Agent, or Firm* — Sughrue Mion, PLLC

(57) ABSTRACT

An advanced wireless communication system, and a method for use at an advanced wireless communication system are disclosed that support direct communication to provide flexible resource pool sharing. The method comprises: measuring, at a first UE, utilization of at least one resource pool of a direct communication channel associated with a configured shared region; transmitting, by the first UE and to at least one second UE, sidelink control information (SCI) identifying a selected resource pool of the at least one resource pool; and transmitting, by the first UE and to the at least one second UE, data associated with the SCI in the selected resource pool.

8 Claims, 11 Drawing Sheets

(51) Int. Cl.
*H04W 72/02* (2009.01)
*H04L 43/0876* (2022.01)
*H04W 24/10* (2009.01)
*H04W 92/18* (2009.01)
*H04W 76/14* (2018.01)

(52) U.S. Cl.
CPC .......... *H04L 5/0053* (2013.01); *H04L 5/0064* (2013.01); *H04L 5/0094* (2013.01); *H04L 43/0876* (2013.01); *H04W 24/10* (2013.01); *H04W 72/02* (2013.01); *H04W 72/0406* (2013.01); *H04W 76/14* (2018.02); *H04W 92/18* (2013.01)

(56) References Cited

U.S. PATENT DOCUMENTS

| | | | | |
|---|---|---|---|---|
| 2010/0281285 | A1* | 11/2010 | Blanding | G06F 9/5027 713/324 |
| 2015/0110060 | A1* | 4/2015 | Yan | H04L 41/08 370/329 |
| 2016/0135143 | A1* | 5/2016 | Won | H04W 12/08 370/312 |
| 2016/0135239 | A1* | 5/2016 | Khoryaev | H04W 72/1289 370/329 |
| 2016/0338094 | A1* | 11/2016 | Faurie | H04W 72/14 |
| 2017/0041902 | A1* | 2/2017 | Sheng | H04W 72/02 |
| 2017/0195995 | A1* | 7/2017 | Zhu | H04W 8/005 |
| 2017/0295579 | A1* | 10/2017 | Sheng | H04W 64/00 |
| 2018/0098369 | A1* | 4/2018 | Yasukawa | H04W 72/10 |
| 2018/0115970 | A1* | 4/2018 | Chae | G08G 1/012 |
| 2018/0124707 | A1* | 5/2018 | Lee | H04W 72/0406 |
| 2018/0213379 | A1* | 7/2018 | Xiong | H04W 40/22 |
| 2019/0075547 | A1* | 3/2019 | Chae | H04W 4/40 |
| 2019/0208441 | A1* | 7/2019 | Wang | H04W 28/0284 |
| 2019/0357304 | A1* | 11/2019 | Zeng | H04L 5/0053 |
| 2020/0296731 | A1* | 9/2020 | Chae | H04W 72/085 |

FOREIGN PATENT DOCUMENTS

| | | |
|---|---|---|
| WO | 2016/117940 A1 | 7/2016 |
| WO | 2017/026409 A1 | 2/2017 |

OTHER PUBLICATIONS

"D2D Measurement Reporting", 3GPP TSG-RAN WG2 Meeting #87bis, R2-144395, Sony, Oct. 6-10, 2014, 2 pages, Shanghai, China.

"Discussion on resource pools and SA resource pattern", 3GPP TSG-RAN WG1 Meeting #84bis, R1-162410, ZTE, Apr. 11-15, 2016, Busan, Korea.

Written Opinion for PCT/JP2017/011295, dated Jun. 20, 2017.

International Search Report for PCT/JP2017/011295, dated Jun. 20, 2017.

Notice of Reasons for Refusal dated Jun. 2, 2020, from the Japanese Patent Office in Application No. 2019-514144.

* cited by examiner (a) FDM partitioning (b) Index partitioning

```
Shared Region configuration/pre-configuration IE parameters:
401
402  * Resource pool/sub-pool ID:Resource pool ID "SL-TxPoolIdentity"
     * Type:SA or Data portion
     * Resource allocation parameters:{
403     > if Type = SA portion:
          # Sharing:Localised/Distributed/Whole
404       # Index/bitmap:
405       If Sharing == Localised, Index = list of Nf values of size <= max{Nf}/2
          If Sharing == Distributed, Index = list of SA indices of size < max{SA
                       sub-pool index)
          If Sharing == Whole, this field is not present
406     > if Type = Data portion:
          # Sharing:FDM/TDM/Whole
          # List of Shared Region(size = number of shared regions)
407       If sharing == FDM
              # PRB start, end/number, or
              # PRB bitmap(representing PRBs that are within the Data portion only)
408       If sharing == TDM
              # Subframe start, end/number, or
              # Subframe bitmap(representing subframes that are within the Data
                 portion only)
          If sharing == Whole, this list is not present}
```

METHODS AND SYSTEM FOR DEVICE-TO-DEVICE COMMUNICATION

CROSS REFERENCE TO RELATED APPLICATIONS

This Application is a National Stage of International Application No. PCT/JP2017/011295 filed Mar. 22, 2017, claiming priority based on Australian Patent Application No. 2016903889 filed Sep. 26, 2016, the disclosure of which is incorporated herein in its entirety by reference.

TECHNICAL FIELD

The present invention relates to advanced wireless communication. In particular, although not exclusively, the invention relates to direct communication between UEs.

BACKGROUND ART

Abbreviations

| | |
|---|---|
| 3GPP | 3$^{rd}$ Generation Partnership Project |
| C-ITS | Cooperative-ITS |
| D2D | Device-to-Device |
| DSRC | Dedicated Short Range Communication |
| DL | Downlink |
| FDD | Frequency Division Duplexing |
| FDM | Frequency Division Multiplexing |
| I2X | Infrastructure-to-Everything |
| ITS | Intelligent Transportation Systems |
| LTE | Long Term Evolution |
| LTE-A | LTE-Advanced |
| LTE-A Pro | LTE-Advanced Pro |
| MAC | Media Access Control |
| MC | Mission Critical |
| P2X | Pedestrian-to-Everything |
| PRB | Physical Resource Block |
| ProSe | Proximity Services |
| PSCCH | Physical Sidelink Control Channel |
| PSSCH | Physical Sidelink Shared Channel |
| PUSCH | Physical Uplink Shared Channel |
| QoS | Quality of Service |
| RAN-WG1 | Radio Access Network - Working Group 1 |
| RB | Resource Block |
| RRC | Radio Resource Control |
| RX | Receiving |
| SA | Scheduling Assignment |
| SC | Sidelink Communication |
| SCI | Sidelink Control Information |
| SIB | System Information Block |
| TB | Transport Block |
| TDD | Time Division Duplexing |
| TDM | Time Division Multiplexing |
| TTI | Transmit Time Interval |
| TX | Transmitting |
| UL | Uplink |
| URLLC | Ultra-Reliable and Low Latency Communication |
| USIM | Universal Subscriber Identity Module |
| V2X | Vehicle-to-Everything |
| VANET | Vehicular Ad-Hoc Network |
| WAVE | Wireless Access for Vehicular Environment |

With growing populations, Intelligent Transportation Systems (ITS) are likely to be an important part of smart solutions for future smart cities. Traditionally standalone technologies, such as GPS for car navigation, car sensors for in-lane assist and cruise control, and roadside sensors for traffic light control, are likely to be replaced by more advanced cooperative systems that enable real time communication between vehicles (e.g. cars, buses and trains), roadside infrastructure (e.g. traffic units), and vulnerable road users such as pedestrians and cyclists. This is particularly evident as the demand for safer and more efficient urban mobility increases.

Cooperative-ITS (C-ITS) may provide enhanced road safety through active and predictive traffic management, railway management, and Cooperative Awareness Messages (CAMs). Similarly, warning messages, live traffic and road conditions, and vehicle condition status data can be sent between vehicles and to and from traffic control centres.

Innovative C-ITS applications and services ranging from car park reservation/guidance/payment, car fault diagnostics and service booking, to autonomous self-driving cars are envisaged using Vehicle-to-Everything (V2X), Infrastructure-to-Everything (I2X) and Pedestrian-to-Everything (P2X) communication for both public and private transport. In order to realise this, ultra-reliable, ultra-fast and efficient communication is a critical key component to enable the system and its future evolution.

Various radio access technologies have been proposed for C-ITS to provide a direct wireless communication link between different road users and infrastructure nodes within a transportation network, and without routing through a central radio station. These technologies include IEEE 802.11a (the DSRC standard) and IEEE802.11p (the WAVE or VANET standard). However, due to their nondeterministic behaviour and collision avoidance, these technologies may not provide the required ultra-fast and ultra-reliable performance in challenging environments, such as where vehicle and/or pedestrian traffic is highly congested and when there are rapid changes in the operating environment.

4G LTE-Advanced (LTE-A) based sidelink technology, which was originally developed under the 3rd Generation Partnership Project (3GPP) for Device-to-Device (D2D) discovery and communication for Proximity Services (ProSe) in Mission Critical (MC) applications, may be a potential communication solution for C-ITS due to its deterministic behaviour. Furthermore, LTE-A based sidelink technology may evolve to fulfil ultra-fast and ultra-reliable performance requirements, regardless of frequency band. As such, LTE-A based sidelink technology is a more attractive technology for C-ITS in the 5.9 GHz band, which is set aside by many government regulators C-ITS applications and services.

Unlike the IEEE technologies, LTE-A sidelink technology supports multi-mode operation, which allows devices to function either in-coverage under cellular network control (mode 1 or mode 2) or autonomously in out-of-coverage area without any network assistance (mode 2).

When LTE-A sidelink is set up to operate on a cellular frequency, it uses radio resources on the Uplink (UL) carrier (in the case of FDD band) or the UL subframes of a carrier (in the case of TDD band) for sidelink control (SC) signalling and data Transport Block (TB) transmission. For in-coverage mode 1 and mode 2 operations, these radio resources are reserved by cellular network base stations using Layer-3 System Information Block (SIB) broadcast configuration signalling.

When LTE-A sidelink is operating in an out-of-network coverage area, frequency carrier(s) and mode 2 communication radio resources are preconfigured for each sidelink capable device, for example by using USIM.

As part of the process of defining an LTE-A sidelink resource structure on a frequency carrier, a set of radio resources having multiple resource blocks (RB) in the frequency domain and over a number of subframes for sidelink communication in the time domain is configured/preconfigured as the frequency chunks and Sidelink Control Period (SC Period) respectively, forming a configurable resource pool. Furthermore, multiple resource pools can be defined for mode 1 and mode 2 communications.

In mode 1 communication, a resource pool consists of a Scheduling Assignment (SA) portion of radio resources for carrying Sidelink Control Information (SCI) and an associated portion of radio resources that can be flexibly used for carrying both sidelink data traffic and cellular UL traffic. The SA portion and its associated data portion can be multiplexed in TDM or FDM manner. For a transmitting User Equipment (UE), the exact resources to be used for SCI and sidelink data transmissions within the SA portion and the sidelink/uplink traffic portion, respectively, are scheduled by the base station.

In mode 2 communication, much like mode 1, the resource pool structure also comprises an SA portion and an associated data portion of radio resources, where the SA portion and its associated data portion can be multiplexed in a TDM or FDM manner. In contrast to mode 1 communication, however, the data portion in mode 2 resource pools can only be used for sidelink data TB transmission and the selection of resources (in both SA and data portions) is to be performed autonomously by the transmitting UE.

Generally, the above semi-static configuration type of sidelink resource allocation by a local base station, or static type using pre-configuration for out-of-coverage areas, is adequate for general purpose ProSe sharing common resource pools in MC communication, as the number of UEs and expected traffic volume is usually predictable within a cell or UE transmission range. However, for multiple services and/or applications having different QoS demands in C-ITS, common resource pools for sharing the services and/or applications of different QoS demands does not provide a guaranteed QoS due to collision on signalling and/or data transmission among devices of different services, i.e. inter-services traffic collision.

To resolve this problem, 3GPP RAN-WG1 has endorsed a proposal in which a resource pool can be semi-statically (i.e. via configuration) or statically (i.e. via pre-configuration) partitioned into multiple sub-pools in time or in frequency, and where each partitioned resource sub-pool is in turn allocated or configured for use by a communication service or services of the same QoS, such as V2X, I2X or P2X communications. This approach may resolve QoS issues caused by inter-services traffic collision, but it creates further problems in resources utilisation and/or complex scheduling due to the dynamic nature of traffic demand and the slow reconfiguration of resources from the local base station. This leads to a scenario where a resource sub-pool may be heavily congested, while other resource sub-pool(s) are underutilised but cannot not be immediately used.

As such, there is clearly a need for improved wireless communications systems and methods.

It will be clearly understood that, if a prior art publication is referred to herein, this reference does not constitute an admission that the publication forms part of the common general knowledge in the art in Australia or in any other country.

SUMMARY OF INVENTION

Technical Problem

The present invention is directed to systems and methods for use at an advanced wireless communication system, which may at least partially overcome at least one of the abovementioned disadvantages or provide the consumer with a useful or commercial choice.

Solution to Problem

With the foregoing in view, the present invention in one form, resides broadly in a method for use at an advanced wireless communication system supporting direct communication to provide flexible resource pool sharing, the method comprising:

measuring, at a first UE, utilization of at least one resource pool of a direct communication channel associated with a configured shared region;

transmitting, by the first UE and to at least one second UE, sidelink control information (SCI) identifying a selected resource pool of the at least one resource pool; and transmitting, by the first UE and to the at least one second UE, data associated with the SCI in the selected resource pool.

The shared regions may be configured by a base station. The shared regions may be configured by broadcast signalling.

The shared regions may be preconfigured.

Preferably, the SCI includes a pool identifier (pool_ID), identifying the selected resource pool.

The resource pool may comprise a sub-pool.

The first UE may report the measured utilization to a base station, and in response thereto receive an indicator of a resource pool for transmission of the data.

The first UE may transmit the SCI in a resource pool designated to the first UE.

The at least one resource pool may comprise a plurality of resource pools that are time or frequency division multiplexed.

The shared region may comprise a plurality of regions configured independently for scheduling and data portions of each resource pool.

The shared region may be defined to be localised, distributed or an entire scheduling portion of a resource pool.

The shared region may be defined to be localised by a collection of radio resource blocks (RBs) that are adjacent to each other in time and in frequency.

The shared region is defined to be distributed by a set of selected RBs that are distributed in time and/or in frequency.

The frequency domain multiplexing of shared and fixed data resource regions may be defined according to a physical resource block (PRB) start and end number for each shared region.

The frequency domain multiplexing of shared and fixed data resource regions may be defined according to a PRB bitmap.

The time domain multiplexing of shared and fixed regions may be defined by a subframe start and end number for each shared region.

The time domain multiplexing of shared and fixed data resource regions may be defined by a subframe bitmap.

Measuring the utilization of the at least one resource pool may be performed by SA decoding and determining data resource allocations for each SCI, energy sensing of SA and Data RBs, or a combination thereof.

Preferably, under-utilised SA and data resources (RBs) are selected for message transmission during a next SC Period according to the measured utilisation.

The method may include forming a virtual resource pool, and transmitting the SCI in a scheduling portion of the virtual resource pool and the associated data in a data portion of the virtual resource pool.

The virtual resource pool may comprise a host pool and one or more guest pools.

The host pool may comprise a resource pool originally designated to the first UE.

The guest pool may comprise one or more shared data regions of the selected resource pool.

The SA portion of the host pool may comprise a virtual SA portion of the virtual resource pool.

A virtual data portion of the virtual resource pool may comprise a shared region of the selected resource pool.

A virtual data portion of the virtual resource pool may comprise a combination of data portions of the host pool and the guest pool.

Data resource selection and resource allocation parameters may be determined based on the virtual data portion.

Certain embodiments of the present invention provide an enhanced mode-2 resource pool structure and associated measurement/reporting techniques to enable cross mode 1-2 dynamic scheduling or resource sharing.

Embodiments of the present invention provide an enhanced mode-2 resource pool structure having flexible configurable sub-pools being arranged in a FDM and TDM fashion, which enables different types of services with different QoS to share the same resource pools concurrently without affecting each others guaranteed performance.

Embodiments of the present invention provided an enhanced mode-2 resource pool structure with configurable resource sub-pools being shared partially or fully, and associated methods in measurement to optimise overall system resource utilisation while minimising or eliminating inter-service traffic collision and therefore maintaining guaranteed QoS.

Embodiments of the present invention provide a virtual resource pool for use in mode-2 sidelink communication, where a virtual resource pool comprises the configured primary designated sub-pool and all configured secondary sub-pools' shared regions prior to the immediate incoming configured primary designated sub-pool. Furthermore, in contending for one or more channel resources within a constructed virtual resource pool for sending control and/or data, an advanced-UE may consider channel resources from all configured secondary sub-pools' shared regions with the same probability for channel index(es) selection to eliminate common problem of congested traffic spill directly to the least congested resource sub-pool when a resource sub-pool is selected prior to channel selection.

Embodiments of the present invention further provide a resource structure and method to enable URLLC for use in V2X, i.e. enabling late arrival packets and or delay sensitive data packets to be sent using shared resource pools.

Embodiments of the present invention relate generally to LTE-based device-to-device (D2D) or sidelink communication technology for use in Vehicle to Everything (V2X), Infrastructure to Everything (I2X) and Pedestrian to Everything (P2X) communications, which support Intelligent Transportation Systems (ITS). In particular, sidelink resource pool structures and associated methods are disclosed, for use at a base station and its sidelink capable advanced UEs, to provide flexible resource pool or resource sub-pool sharing.

In certain embodiments, the resource pool structures and associated methods enable cross-mode (or so-called inter-modes, e.g. mode 1 and mode 2) and intra-mode (e.g. within mode 2) resource sharing, maximising resource utilisation and minimizing inter-services traffic collision while maintaining desirable quality of services (QoSs).

According to certain embodiments, an enhanced resource pool structure is provided comprising resource pool(s) and/or resource sub-pool(s) which comprise configurable shared regions. The shared region(s) within a resource pool or resource sub-pool may be configured or preconfigured for data pool/sub-pool only, or independently for control pool/sub-pool and associated data pool/sub-pool. Specifically, configurable control shared region(s) of a resource pool/sub-pool may be arranged to comprise localised resources, distributed resources, or entire control pool/sub-pool for sidelink control information transmission/reception. A distributed shared region within a control pool/sub-pool may comprise control channel indexes being distributed in time and in frequency, preferably in random fashion or pseudo-random fashion.

The configurable data shared region(s) of a resource pool/sub-pool may be arranged to comprise localised resources, or distributed resources, or entire data pool/sub-pool resources for data TBs transmission/reception. A distributed shared region within a data pool/sub-pool may comprise multiple groups of data resources being distributed either in time or in frequency.

In another embodiment of the present invention, advanced UEs being capable of direct communication may be configured and scheduled to perform mode-1 sidelink communication. A configured mode-1 resource pool may comprise a primary resource pool and be prioritized for frequent use. Via additional signalling, which is only decodable at an advanced UE, a mode-2 enhanced resource pool with a configured shared region as secondary resource pool may be provided for monitoring and offloading traffic when needed.

According to embodiments of the present invention, any shared region(s) between 2 consecutive first and second mode-1 SA pools starting at the boundary immediately after a first mode-1 SA pool may be defined as a secondary data pool belong to the first mode-1 SA pool. Upon request or on a configured periodic basis, an advanced UE may measure and report the utilisation of its configured secondary resource pool(s) to it servicing base-station. Once being scheduled, an advance UE may transmit the SCI (sidelink control information) in its primary mode-1 SA pool and associated data TBs in the associated secondary data pool. Additionally, advanced UE(s) performing sidelink data reception may monitor both primary mode-1 data pool and any configured secondary data pool for data TBs reception and decoding, thus enabling cross-mode resource sharing or cross-mode scheduling. This in turn allows mode-1 sidelink traffic to instantaneously spill over to under-utilised mode-2 channel resources which was configured for sharing, hence resolving already congested mode-1 resources, or mode-1 resource being taken by higher priority cellular communication, or enabling the immediate delivery of late arrived delay-intolerant-message by using other shared resource pools prior to the next incoming designated resource pool for data TB transmission.

In other aspect of the present invention, advanced UEs being capable of direct communication for a specific service may be indicated via legacy signalling with primary sidelink resource pools/sub-pools for mode-2 sidelink communication. As being an advanced UE, it may be further indicated, via additional or advanced signalling being designed for being decodable only at an advanced UE, with other secondary mode-2 resource pool(s)/sub-pool(s) with configured shared region(s) as secondary resource pool(s)/sub-pools for monitoring and offloading its traffic (control and/or data) when it is appropriate. Secondary mode-2 resource pool/sub-pools may be configured for primarily use by other service(s), assisting the resolution of inter-services traffic collision if a common resource pool is configured for sharing among plurality of services.

According to the embodiments of the present invention, in order to retain the inter-services traffic collision avoidance property of resource pool/sub-pool per individual service and resolving introduced poor resource utilisation due to service traffic imbalance and instantaneous change, any indicated shared region(s) (i.e. SA and data) of configured secondary resource between 2 consecutive mode-2 primary resource pools/sub-pools starting at the boundary immediately after a first mode-2 resource pool/sub-pool may be considered as secondary resource pool(s)/sub-pool(s) belong to the first mode-2 primary resource pool/sub-pool forming a virtual resource pool/sub-pool for SA or data or SA and data for use. Prior to any MAC PDUs transmission, an advanced-UE may monitor its constructed virtual resource pool/sub-pools to identify available resources for use in its SCI and associated data TBs transmission where it may consider channel resources belong to its primary sidelink resource pools/sub-pools having higher priority for use than channel resources belong to its secondary sidelink resource pools/sub-pools, that implies that an advanced-UE will only use channel resources that belong to its configured secondary sidelink resource pools/sub-pools within its constructed virtual resource pool/sub-pool for control and/or data transmission only if it has detected resources belong to its primary sidelink resource pools/sub-pools is congested or about fully utilised.

Furthermore, within available channel resources of the same category (i.e. primary/host or secondary/guest) resulted from UE-implemented observation scheme on a constructed virtual resource pool/sub-pool, as part of channel contention, an advanced UE may randomly select one or more channels within the available channels for SA and data TBs transmission and therefore resolving the case where congested traffic spilling from the most congested resource pool/sub-pool directly to the least congested resource pool/sub-pool, skipping other less-congested resource pools/sub-pools in-between, if channel selection is done on logical resource pool/sub-pool basis as most UE tend to choose the least congested resource pool/sub-pool if its own resource pool/sub-pool is congested.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings.

FIG. 4A illustrates an exemplary Information Element (IE), according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

Description of Embodiments

Systems and methods are described which provide mechanisms which enable a base station to either dynamically indicate to a sidelink TX-device to use another resource pool or other partitioned resource sub-pool(s) for immediate data transmission if its dedicated data resource pool or sub-pool is congested at that time, or to semi-statically configure (or have preconfigured) an advanced sidelink capable device with one or more secondary resource sub-pool(s) which can be utilised for data transmission if its primarily dedicated resource sub-pool is congested. Embodiments described herein also enable cross modes resource pool sharing, i.e. mode 1 TX-devices using Mode 2 resource pool for data transmission/reception.

The term resource pool used herein denotes a collection of physical radio resources in both time and frequency domain of a frequency carrier, and it is commonly configured and used for LTE-based D2D/sidelink communications. Similarly, the term SC period denotes a Sidelink Communication Period as a time period/duration of a resource pool.

Figure 1:
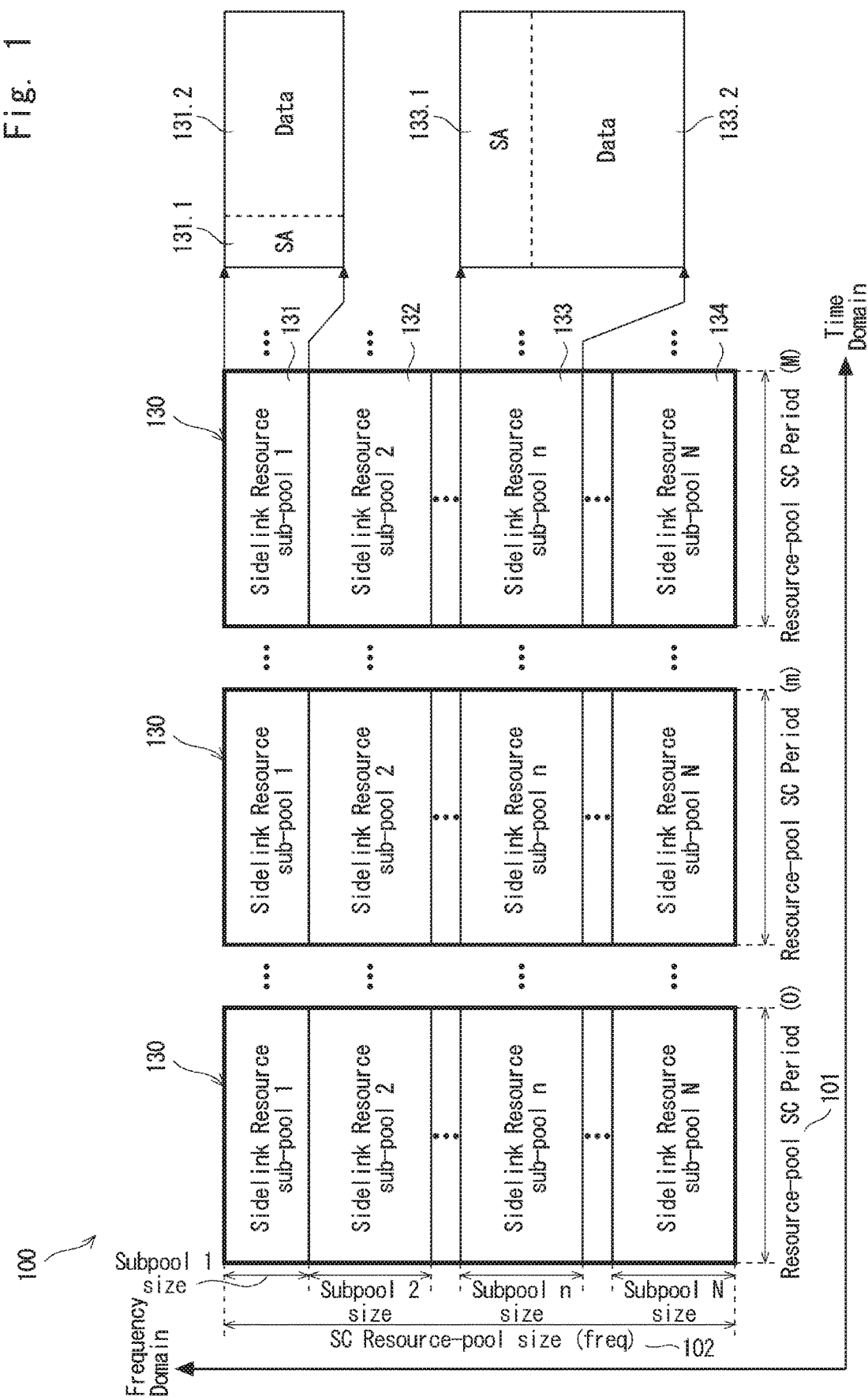
FIG. 1 illustrates a TDM sidelink communication resource pool configuration, according to an embodiment of the present invention.

FIG. 1 illustrates a TDM sidelink communication resource pool configuration 100, according to an embodiment of the present invention. The resource pool configuration 100 is configured to resolve inter-service traffic collision caused by several services, of different QoS, sharing a common sidelink resource pool for concurrent control and data transmission/reception.

The configuration 100 includes a TDM Sidelink communication resource pool 130 of size 102 (in the frequency domain) and 101 (in the time domain). The resource pool 130 is partitioned into multiple sub-pools (also called 'sub-channels') 131, 132, 133, 134, having different sizes.

Each portioned sub-pool 131, 132, 133, 134 may be scheduled for primary use by one or more services with the same or similar QoS. This may eliminate inter-traffic collision caused by multiple services in a common resource pool.

Each partitioned sub-pool comprises a Scheduling Assignment (SA) portion, for carrying Sidelink Control Information (SCI) from transmitting UEs and nodes, and an associated data portion, for carrying sidelink data Transport Blocks (TBs) that have been scheduled by the transmitted SCI during the SA portion. The SA and data portions may be time-multiplexed or frequency-multiplexed.

The pool configuration comprises a plurality of resource pools 130, each comprising multiple partitioned sub-pools 131, 132, 133, 134. Each sub-pool 131, 132, 133, 134 is independently configured to have time-multiplexed SA 131.1 and data portions 131.2, or frequency-multiplexed SA 133.1 and data portions 133.2, enabling flexible resource sharing, as described in further detail below.

The SA and/or data portion of a resource sub-pool may be configured by a network base station, or preconfigured, to comprise one or more shared regions that can be used for flexible utilisation of sidelink resources by other UEs/nodes subscribed to different services and/or applications. This may assist in resolving the issue of ineffective resource utilisation caused by imbalanced and fluctuated services traffic when dedicated sub-pools are allocated for a particular services without sharing capability. For example, a resource sub-pool that was originally allocated for P2X service with shared regions being configured, could be used for V2X service message transmission and via versa.

Figure 2:
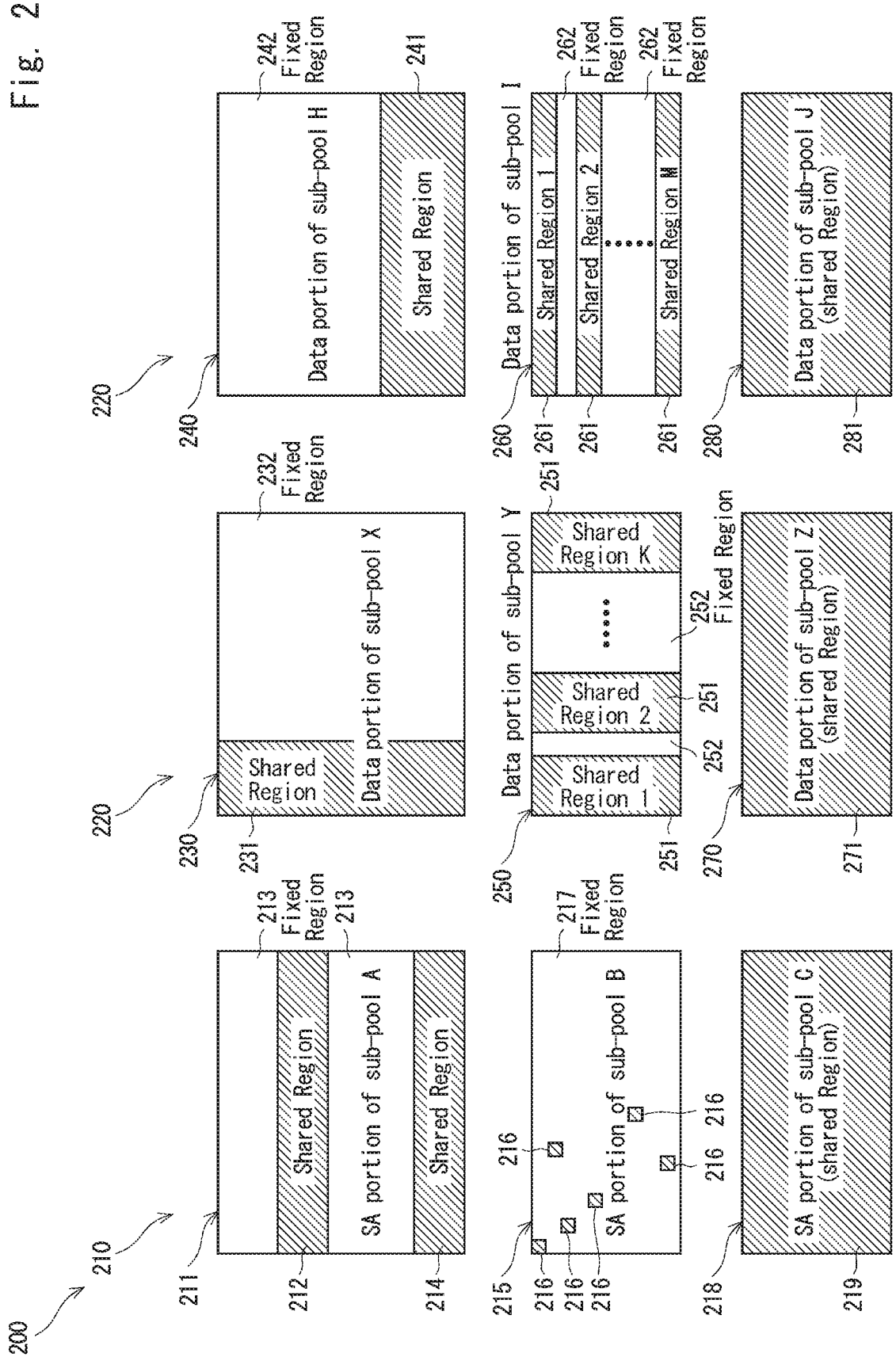
FIG. 2 illustrates a configuration of a resource sub-pool, illustrating partitioning of shared and fixed regions for SA and data portions, according to an embodiment of the present invention.

FIG. 2 illustrates a configuration of a resource sub-pool 200, illustrating partitioning of shared and fixed regions for SA and data portions, according to an embodiment of the present invention. In particular, a shared region can be independently configured for the SA and data portions using various approaches including a localised, distributed or whole configuration, and in a TDM or FDM manner. Furthermore, an SA portion with a shared region configured using one approach may be associated with a data portion that is configured with a shared region using other approaches.

The sub-pool 200 includes an SA portion 210, where shared regions can be configured per SL resource sub-pool in a localised manner as illustrated in sub-pool A 211, a distributed manner as illustrated in sub-pool B 215, or for an entire region as illustrated in sub-pool C 218.

The localised configuration illustrated in sub-pool A 211 comprises a subset of radio resources in form of Resource Blocks (RBs) that are adjacent to each other and grouped together to form shared regions 212, 214. Other SA resources that are not part of the shared regions 212, 214 form fixed regions 213. Since SA resources are divided into upper and lower sections, a shared region 212 that is defined for the upper section will automatically have a corresponding shared region 214 in the lower section for SA repetition. This is further exemplarily illustrated in FIGS. 3A and 3B.

The distributed configuration illustrated in sub-pool B 215, where a subset of radio resources are scattered within the SA portion, but are grouped together for form a shared region 216. Other SA resources that are not part of the shared region form a fixed region 217.

Finally, sub-pool C 218 includes the whole SA portion being configured as a shared region 219, which provides maximum freedom of SL resource selection.

Figure 3A:
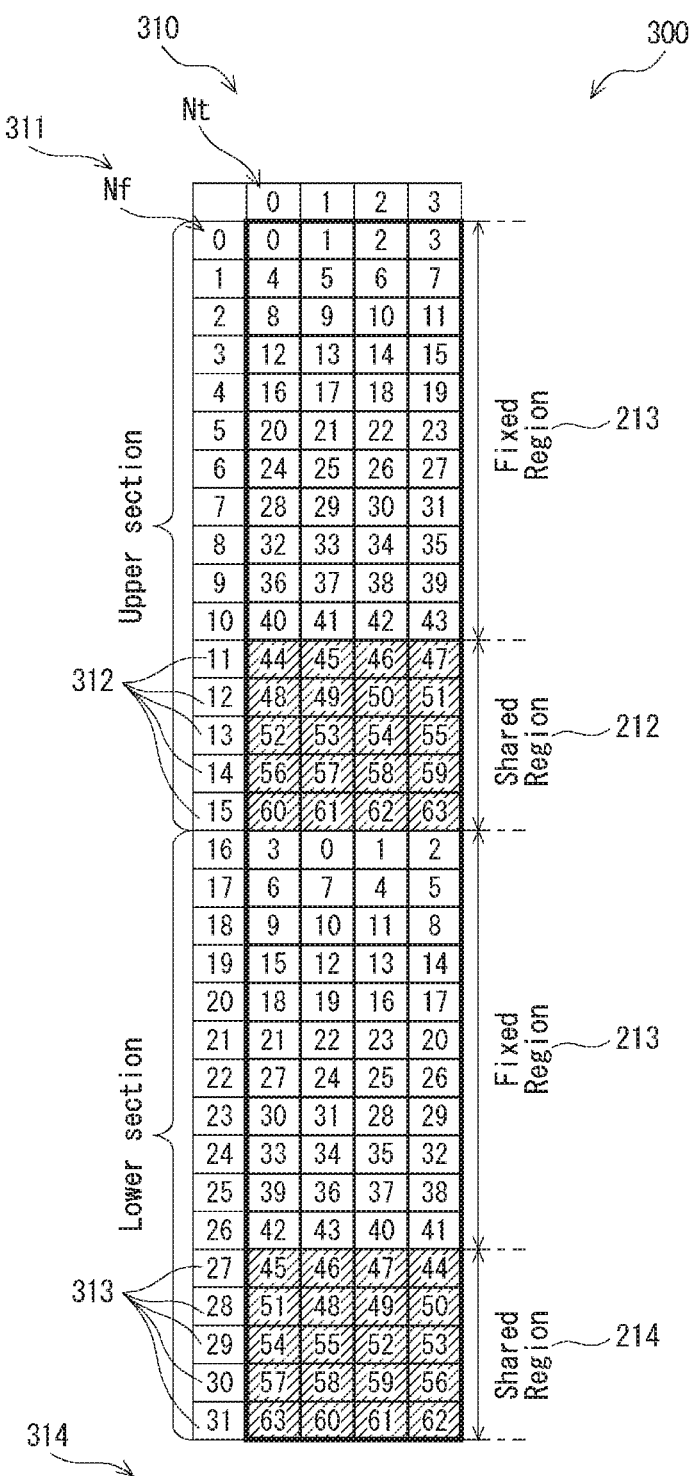
FIG. 3A illustrates exemplary partitioning of SA portions of resource sub-pools, according to an embodiment of the present invention.
Figure 3B:
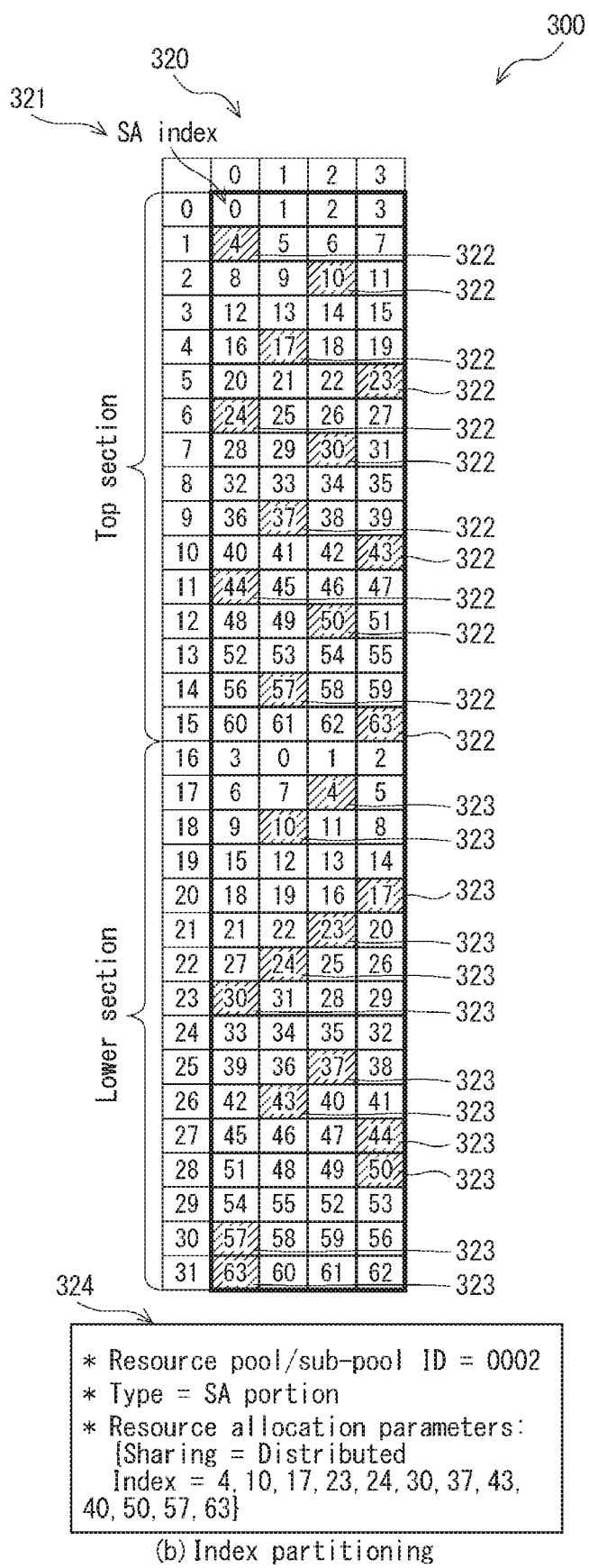
FIG. 3B illustrates exemplary partitioning of SA portions of resource sub-pools, according to an embodiment of the present invention.

FIGS. 3A and 3B illustrates exemplary partitioning 300 of SA portions of resource sub-pools, according to an embodiment of the present invention.

In FIG. 3A, a first SA portion 310 is illustrated to exemplify configuration of shared regions in a localised manner. In particular, a network parameter (Nf) 311 represents a row of SA RBs that are adjacent to each other in time, and is used for defining the shared regions. A first set of Nf values 312 (i.e. Nf=11, 12, 13, 14, 15) is configured as a shared region for the SA upper section, and a second set of Nf values 313 (i.e. Nf=27, 28, 29, 30, 31) is configured as a shared region in the lower section, to provide FDM partitioning of shared regions 212 and fixed regions 213.

In FIG. 3B, a second SA portion 320 is illustrated to exemplify configuration of shared regions in a distributed manner. In particular, an SA index 321 represents an SA RB, and is used for defining the shared regions. In this case, a set of SA indices 322 (SA Index=4, 10, 17, 23, 24, 30, 37, 43, 44, 50, 57, 63) is configured to define the shared region 322 in the upper section, and the shared region 323 in the lower section of the SA portion. In contrast to the localised configuration described above, this type of distributed configuration allows the shared region/resources to be scattered across the entire SA portion, which provides further flexibility in the definition of the shared region definition.

Now turning back to FIG. 2, the sub-pool 200 includes data portions 220, where shared regions can be configured per SL resource sub-pool in a localised manner as illustrated in sub-pool X 230 and sub-pool H 240, in a distributed manner as illustrated in sub-pool Y 250 and sub-pool I 260, or for an entire region as illustrated in sub-pool Z 270 and sub-pool J 280. The shared regions of the data portion 220 can be configured in a localised or distributed manner in the frequency domain or the time domain, as illustrated in sub-pool X 230, sub-pool H 240, sub-pool Y 250 and sub-pool I 260.

The data portion of sub-pool X 230 includes a single shared region 231, which is configured to be time division multiplexed (TDM) with the remaining data resources in a fixed region 232. Alternatively, the data portion of sub-pool H 240 includes a localised share region 241, which is frequency division multiplexed (FDM) with a fixed region 242.

The sub-pool Y 250 includes multiple shared regions 251, which are configured to be multiplexed with fixed regions 252 in the time domain. Alternatively, the sub-pool I 260 includes multiple shared regions 261, which are configured to be multiplexed with fixed regions 262 in the frequency domain, to allow configuration flexibility based on super-pool structure type.

Finally, the sub-pool Z 270 and sub-pool J 280 are configured such that the entire data portion is a shared region 271, 281.

FIG. 4A illustrates an exemplary Information Element (IE) 400, according to an embodiment of the present invention. The IE 400 enables versatile partitioning structures between the share and fixed regions, as described above. The IE 400 contains parameters, described in further detail below, that define the shared region(s) for SA and data portions of a resource sub-pool during broadcast configuration or pre-configuration. The skilled addressee will readily appreciate that the list of parameters is not exhaustive, and it is possible to use different set of configuration parameters to achieve a similar outcome.

Initially, a resource pool/sub-pool ID element 401 is used to define SL resource sub-pool in relation to which the IE 400 relates, and a type parameter 402 defines whether the IE 400 relates to an SA or data portion. Different resource allocation parameters are then provided depending on whether the type parameter 402 defines an SA portion or a data portion.

For an SA portion, a sharing element 403 defines whether a localised, distributed or whole shared region is used. If the sharing element 403 defines a localised region, a list of Nf values, with a size of up to maximum of Nf divided by 2, is defined in 404. If the sharing element 403 defines a distributed region, a list of SA indices, with a size of up to a maximum of the SA index for the SA portion, is defined in 405. In another embodiment, a bitmap that corresponds to all possible Nf values or SA indices is provided. If the sharing element 403 defines an entire SA region, no Nf or SA index or bitmap is provided.

For a data portion, a sharing element 406 defines whether FDM, TDM or whole sharing is used. If the sharing element 406 defines FDM sharing, either Physical Resource Block (PRB) start and end numbers are provided, or a PRB bitmap is provided, defining the shared regions, as illustrated in 407.

If the sharing element 406 defines TDM sharing, either subframe start and end numbers are provided, or a bitmap representing subframes are provided, defining the shared regions, as illustrated in 408.

If the sharing element 406 defines whole sharing, not further definition of the shared regions is necessary, and thus is not provided.

The IE 400 is particularly suited to defining shared regions, such as those discussed above with reference to FIGS. 3A and 3B.

Figure 4B:
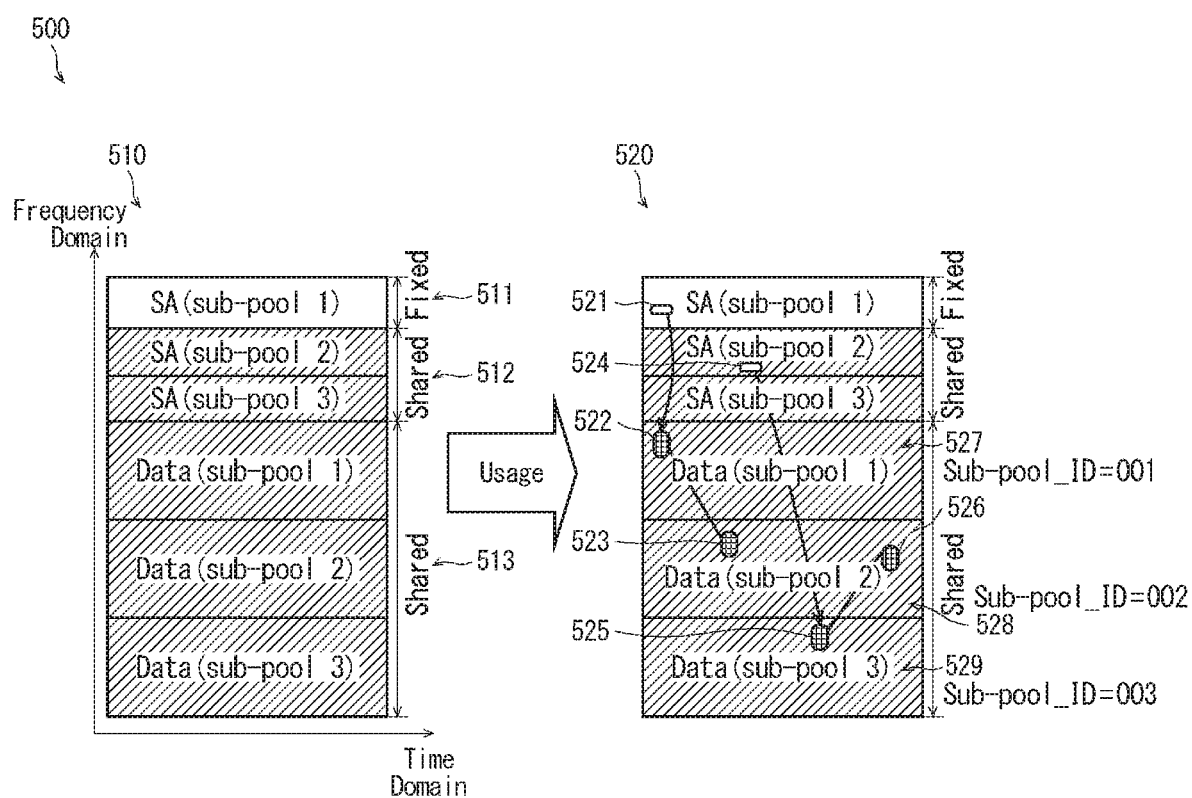
FIG. 4B illustrates an exemplary resource pool partitioning configuration, according to an embodiment of the present invention.
Figure 5:
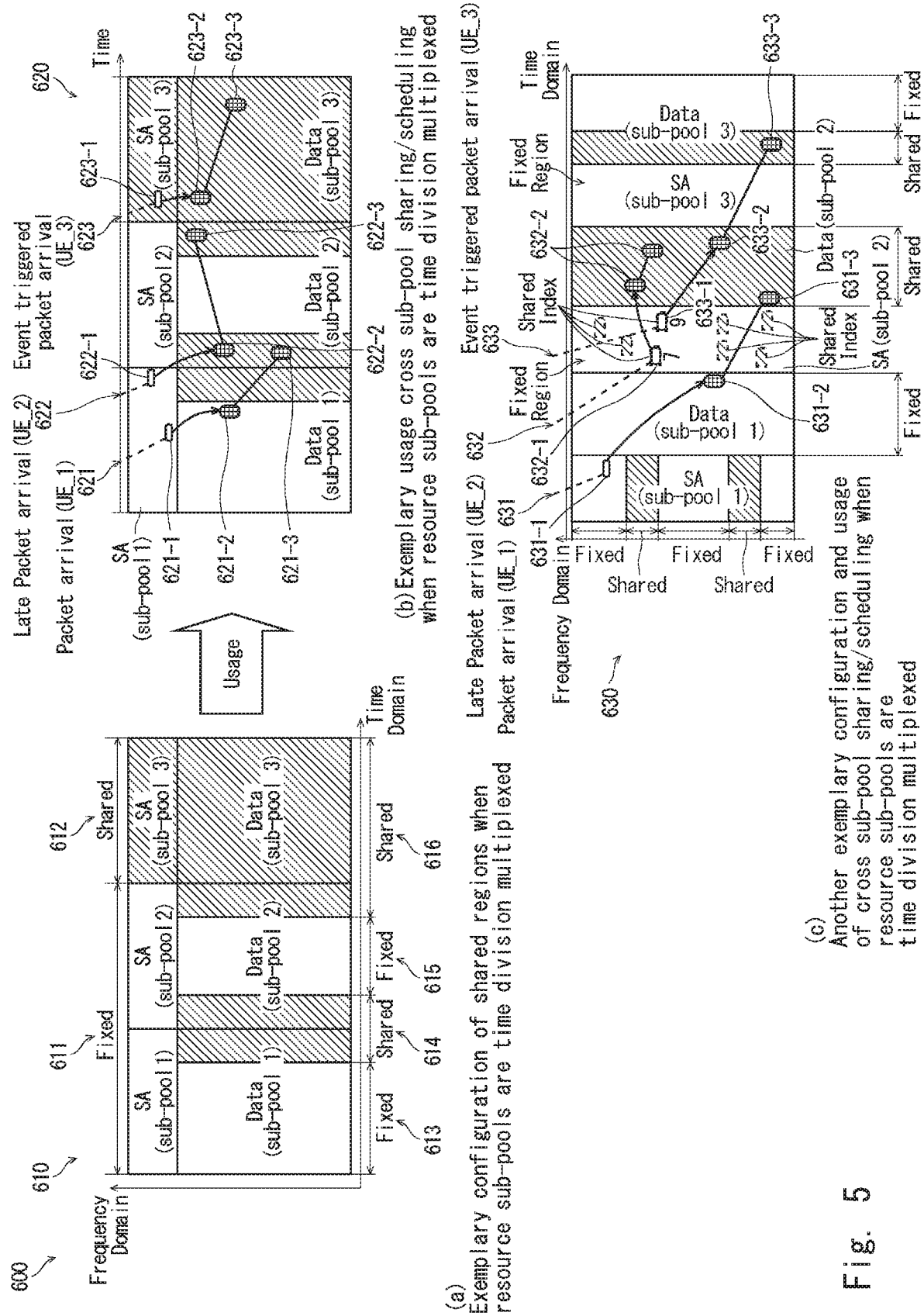
FIG. 5 illustrates an exemplary resource pool partitioning configuration, according to an embodiment of the present invention.

FIG. 4B illustrates an exemplary resource pool partitioning configuration 500, according to an embodiment of the present invention. The configuration 500 is illustrated with reference to a sidelink super-pool with frequency division multiplexed sub-pools.

A configuration 510 is provided, where SA and data portions of resource sub-pools within a sidelink super-pool are a frequency division multiplexed. The whole SA portion and/or data portion of a resource sub-pool may be configured as a shared region, to allow full flexibility for sidelink message transmitters in selecting SA and Data resources.

The whole SA portion of sub-pool 2 and sub-pool 3 define a shared region 512, and the whole data portion of sub-pool 1, sub-pool 2 and sub-pool 3 define a shared region 513. As such, the entire data portion of the sidelink super-pool (which consists of sub-pool 1, sub-pool 2 and sub-pool 3) forms the shared region 513, and can be freely used by all UEs for data TB transmission to avoid heavy traffic congestion concentrated within a particular resource sub-pools.

The configuration 510 is illustrated in use with respect to two message transmissions from two separate UEs, each having its own designated resource sub-pool, in 520.

The first UE has been assigned resource sub-pool 1 as its designated sub-pool, and the first UE transmits its SCI 521 in the SA portion of sub-pool 1. Based on past observation of resource utilisation on the data portion of sub-pool 1 and sub-pool 2, the first UE transmits the associated data TBs 522, 523 in the data portions of sub-pool 1 and sub-pool 2, to minimise further congestion in sub-pool 1.

The second UE has been assigned resource sub-pool 2 as its designated sub-pool and transmits its SCI 524 in the SA portion of sub-pool 2. Similar to the first UE, the second UE transmits the associated data TBs 525, 526 in the data portion of sub-pool 3 and sub-pool 2, based on its past observations to minimise traffic build-up on sub-pool 2.

In order to facilitate cross sub-pool scheduling from the first and second UE, where the shared region(s) of a non-designated resource sub-pool is utilised for message transmission, an identifier of the second sub-pool (Sub-pool_ID), which was given during the initial resource sub-pool configuration, is included as part of the SCI.

Assuming sub-pools associated with Sub-pool_ID 001, 002 and 003 were given at the time of initial resource pool configuration for sub-pool 1 527, sub-pool 2 528 and sub-pool 3 529 respectively and reusing the above cross sub-pool sharing/scheduling example for the first UE, Sub-pool_ID=002 should be included as part of control signalling transmission in 521 as the first UE intends to utilise the shared region of the data portion of sub-pool 2 for data TB transmission 523. Similarly for the control signalling transmission 524 of the second UE, Sub-pool_ID=003 should be included as part of SCI, since the data TB transmission spans across both sub-pool 3 and sub-pool 2.

Figure 7:
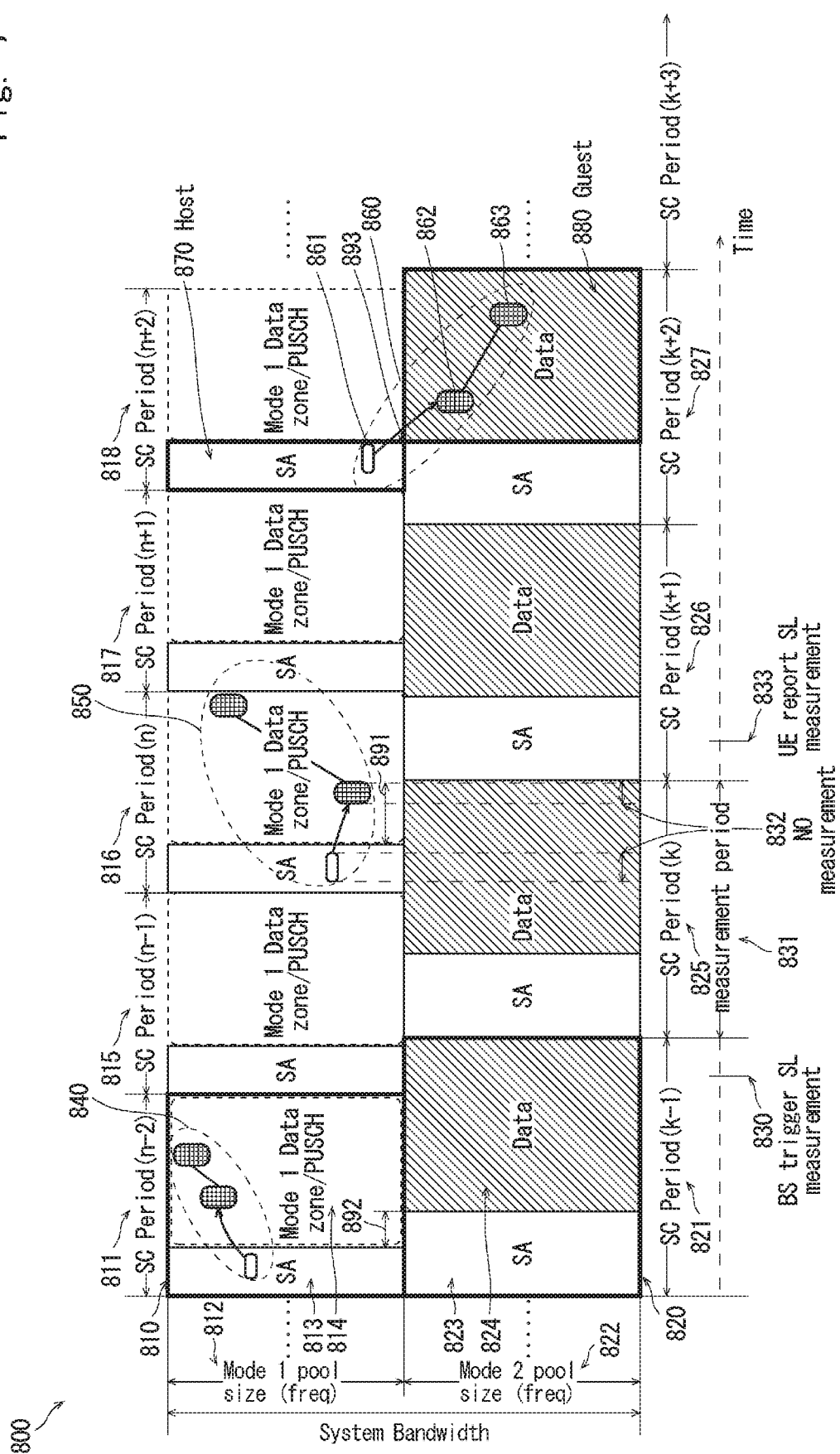
FIG. 7 illustrates a method of cross-mode sharing and scheduling, according to an embodiment of the present invention.

FIG. 7 illustrates an exemplary resource pool partitioning configuration 600, according to an embodiment of the present invention. The configuration 600 is illustrated with reference to a sidelink super-pool with time division multiplexed sub-pools.

A configuration 610 is illustrated where time domain multiplexing of fixed and shared regions is configured for both SA portions 611, 612 and data portions 613, 614, 615, 616. This configuration allows partial sharing without sacrificing a significant amount of resources for services originally intended on being used with the sub-pools.

The configuration is illustrated with reference to an exemplary usage scenario in 620. UE_1 and UE_2 are subscribed to first services that are authorised to transmit message packets in sub-pool 1, and UE_3 is subscribed to different second services that are authorised to transmit in sub-pool 2.

For UE_1, message packets are received at time 621, which provides a sufficient amount of time to process and prepare an SCI 621-1 and data TBs to be transmitted within the sub-pool 1 SC period. Due to first service traffic congestion within the data portion of sub-pool 1, however, UE_1 is only able to find sufficient resources to transmit one data TB 621-2. UE_1 monitors the shared region in sub-pool 2, which is momentarily allocated for second services, and observes that it is under-utilised. UE_1 therefore utilises the shared region within the data portion of sub-pool 2 to transmit its second data TB 621-3 with a high degree of confidence that its second data TB 621-3 will not collide with traffic of the second services.

For UE_2, message packets are received at time 622, i.e. towards the end of sub-pool 1 SC period, which only gives sufficient time to process and transmit an SCI 622-1 within the SA portion of sub-pool 1. Therefore, the shared regions of the data portion of sub-pool 2 are used to transmit data TBs 622-2, 622-3, which enables such late message packets to be transmitted without having to wait for the next sub-pool 1 cycle. In other words, the flexible resource sharing described herein is also advantageous in that it enables late arrival packet delivery using shared resources rather than waiting for the next cycle, making it particularly suitable for ultra-low latency services.

For UE_3, message packets are received at time 623, i.e. during a sub-pool SC period after sub-pool 2, which it was originally authorised to use for transmission. Since the SA and data portions of sub-pool 3 are configured to be fully shared, UE_3 transmits its SCI 623-1 during the SA portion and data TBs 623-2, 623-3 during the data portion of sub-pool 3. This enables the transmission of event triggered packets without delaying transmission to the next sub-pool 2 cycle, as described above.

A configuration 630 is illustrated where shared regions are used for sub-pools with time domain multiplexed SA and data portions. UE_1 and UE_2 are subscribed to services that are authorised to transmit their data packets in sub-pool 1, and UE_3 is subscribed to different services that are authorised to transmit in sub-pool 3.

For UE_1, data packets are received at time 631, which gives sufficient time to process and prepare an SCI 631-1 and data TBs for transmission within the sub-pool 1 SC period. Due to traffic congestion within the sub-pool 1 data portion, resources are only available to transmit one data TB 631-2. Therefore, the shared region within the data portion of sub-pool 2 is used to transmit the second data TB 631-3.

For UE_2, late data packets are received at time 632, i.e. during the data portion of sub-pool 1, which is after the SA portion. UE_2 is therefore not able to transmit any SCI and data TBs during sub-pool 1. In this case, UE_2 instead utilises the shared regions of sub-pool 2 SA and data portions to transmit its SCI 632-1 and the associated data TBs 632-2. This enables UE_2 to accommodate for this late arrival of packets without delaying the transmission to the next sub-pool 1 cycle.

For UE_3, data packets are received at time 633, i.e. during a sub-pool period before its originally assigned sub-pool 3 for transmission. Since the shared regions within the SA and data portions of sub-pool 2 can be utilised by UE_3, UE_3 processes the received packets and immediately transmits an SCI 633-1 using SA index 9 within the SA portion of sub-pool 2, a first data TB (633-2) during the data portion of sub-pool 2 and a second data TB (633-3) using the shared region of sub-pool 3 data portion. This immediate transmission and utilisation of configured shared regions of an earlier sub-pool effectively allows minimisation of transmission delay due to sudden arrival of event triggered packets.

Figure 6:
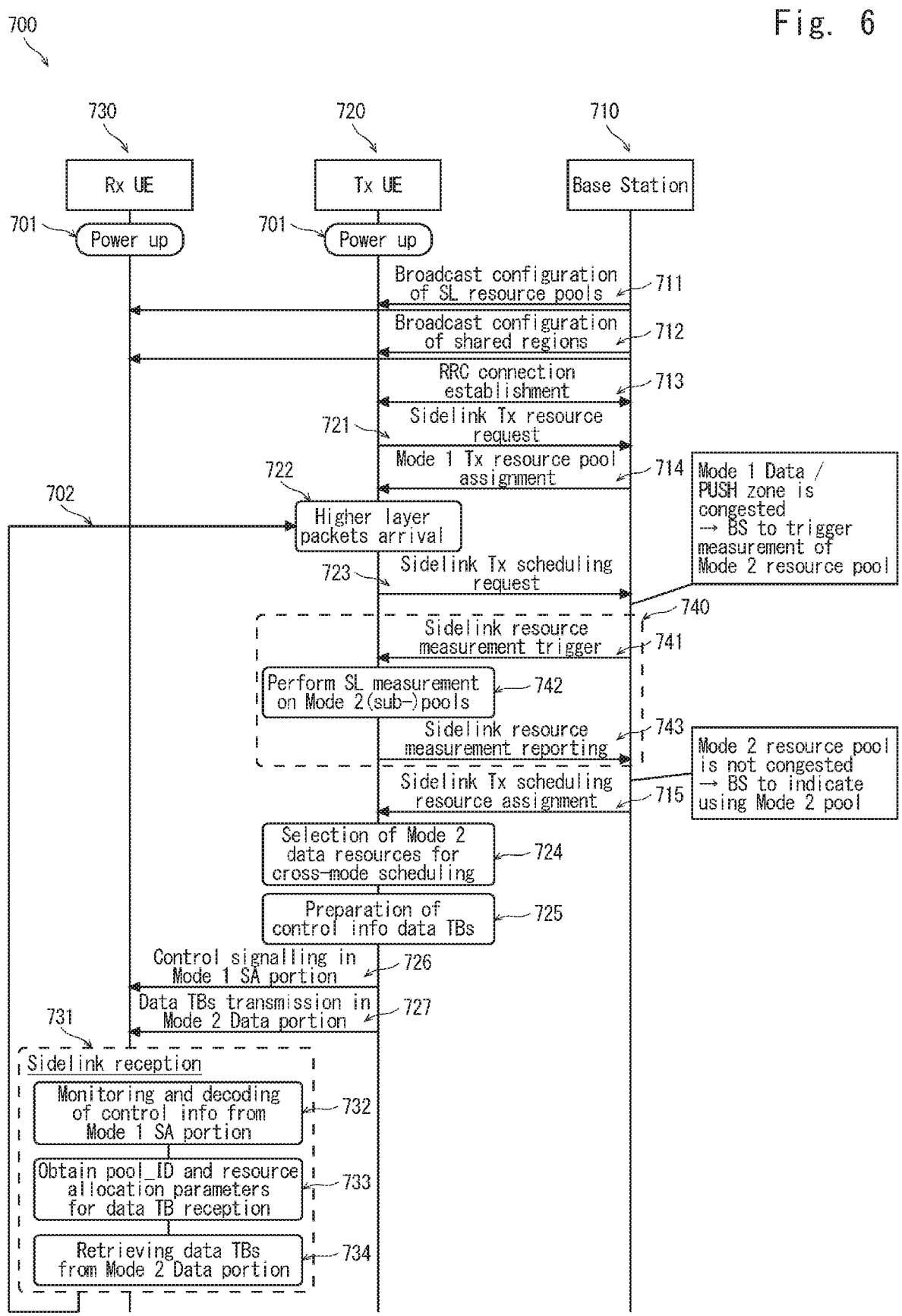
FIG. 6 illustrates a data communication method, according to an embodiment of the present invention.

FIG. 6 illustrates a data communication method 700, according to an embodiment of the present invention. The method 700 is described with reference to a base station 720 and participating mode-1 sidelink communication UEs 720, 730 (i.e. TX-UE and RX-UE). The method 700 enables cross-mode scheduling, which allows the base-station 720 to use under-utilised mode-2 resources that are configured as shared regions for offloading mode-1 data transmission and reception, as needed.

The base station may indicate to its RRC-connected mode-1 sidelink communication UEs, the mode-2 enhanced resource pool structure with configured shared regions, using the IEs disclosed above. The configured shared regions of mode 2 communication resources may be at the resource-pool or resource sub-pool level. The configured shared regions of mode-2 resource may be further monitored and reported on demand or periodically at a configurable interval. When conditions allow, a base station may further instruct a mode-1 TX-UE to transmit SA in a mode-1 SA portion and associated data TBs in a shared mode-2 data portion to reduce or eliminate data collision on its mode-1 data resource pool.

At power up 701 of both the advanced UE performing sidelink message transmission (Tx UE) 720 and the receiving UE (RX UE) 730, sidelink messages on mode 1 and mode 2 communication resource pool/sub-pools are monitored and decoded. In particular, after power up 701 both UEs 720, 730 request to participate and are authorised for sidelink communication under network control.

At step 711, both TX and RX UEs 720, 730 receive and decode broadcast signalling from the local BS about sidelink resource pools and sub-pools configuration information. In this regard, SIB-18 may be used.

At step 712, both UEs 720, 730 receive further dedicated broadcast signalling from the BS 710, also via SIB, for the configuration information about the shared regions for mode 2 resource sub-pools.

Since the TX UE 720 intends on transmitting messages over mode-1 sidelink communication, the UE 720 establishes RRC connection and requests for sidelink resources for transmission to the local BS (710) at steps 713 and 721, respectively, upon which the BS 710 assigns a mode 1 transmission resource pool to the UE 720 at step 714.

At step 722, a Media Access Control (MAC) layer at the TX UE receives message packets from its internal higher layer (e.g. originated from the application layer) and sends transmission request, potentially with a buffer status report, to the BS 710 for sidelink scheduling at step 723.

At this point, since mode 1 data portion resources which are also utilised for PUSCH transmissions by other cellular UEs is fully managed and control by the local BS 710, it has the full knowledge of the usage and scheduling decision for the mode 1 Data/PUSCH zone.

At step 740, if usage of the mode 1 Data/PUSCH zone is fully congested or forecasted to be congested based on the past and existing sidelink mode 1 and cellular UL scheduling requests, sidelink channel measurement related function and messages are carried out in association with the TX UE 720 as steps 741, 742 and 743 as follows.

At step 741, the BS 710 triggers sidelink resource measurement on one or more selected mode 2 resource pool(s) or sub-pool(s).

At step 742, the TX UE 720 measures sidelink resource usage on the indicated mode 2 resource pool(s) and/or sub-pool(s), where the measurement could be based on Block Error Rate (BLER) calculation from decoding SA and data TBs, sensing of energy level on SA and Data portion resources, or a combination of both to determine sidelink resource utilisation rate.

At step 743, the TX UE 720 feeds back the sidelink channel measurement reports to the local BS 710 via the cellular PUSCH channel.

Then, at step 715 and based on the reported sidelink channel measurement (resource utilisation rate), the BS 710 determines whether and which of the mode 2 resource pool(s) or sub-pool(s) are to be used for sidelink message transmission and indicates this assignment to the TX UE along with scheduling information for transmitting SCI in mode 1 SA portion.

At step 724, and based on the mode 2 assignment from the BS and past measurements on the indicated mode 2 resource pool/sub-pool, the TX UE 720 makes selection of resources for data transmission.

At step 725, the TX UE 720 prepares SCI and data TBs for cross-mode scheduling, where the SCI contains the ID of the assigned mode 2 resource pool or sub-pool.

At steps 726 and 727, the TX UE 720 transmits the SCI using the scheduled resources in mode 1 SA portion and data TBs using the selected resources in the assigned mode 2 pool/sub-pool, respectively.

In step 731, the RX UE 730 perform sidelink reception related functions 731 as steps 732, 733 and 734 as follows.

At step 732, the RX UE continuously monitors SA resources and decodes SCI during mode 1 SA portion.

At step 733, from the decoded SCI, the RX UE obtains the ID of mode 2 resource pool/sub-pool and its related data resource allocation information. Then based on these, at step 734, the RX UE proceeds to retrieve and decode data TBs from the mode 2 pool-sub-pool Data portion.

Steps 722 onwards are then repeated, as illustrated by 702, providing an iterative process.

FIG. 7 illustrates a method 800 of cross-mode sharing and scheduling, according to an embodiment of the present invention. The method 800 is depicted for RRC connected mode 1 UE with cross-mode scheduling and transmission.

Initially, multiple sidelink resource pools in the form of a Mode 1 resource pool 810 and a Mode 2 resource pool 820 are configured by a cellular base station through broadcast.

The Mode 1 resource pool 810 has an SC time period 811 and a frequency bandwidth size occupying a top section 812 of the system bandwidth. It comprises an SA portion of resources 813, for transmitting Mode 1 sidelink control/scheduling information, and a radio resources portion 814, which can be flexibly used depending on BS scheduling, for transmitting sidelink Mode 1 data TBs and cellular uplink PUSCH channel. The Mode 1 resource pool structure repeats every mode-1 SC period 811 as shown by repetitions 815, 816, 817, 818.

The Mode 2 resource pool 820 has an SC time period 821 and a frequency bandwidth size occupying the bottom section 822 of the system bandwidth. It comprises an SA portion of resources 823, for transmitting Mode 2 sidelink control/scheduling information, and a data portion of resources 824, which can be used for transmitting sidelink data TBs only. Additionally, the whole data portion 824 of the Mode 2 resource pool is further broadcast configured as a shared region. This Mode 2 resource pool structure 821 repeats every mode-2 SC period as shown by repetitions 825, 826, 827.

An advanced UE that has been assigned by a local BS with the Mode 1 resource pool needs to transmit multiple sidelink messages, which may comprise pluralities of a SCI block and two data TBs as shown by 840, 850, 860, periodically equivalent to every second Mode 1 SC period in 811, 816, and 818.

During the first message transmission 840, the BS may detect an increase in both sidelink Mode 1 transmissions and uplink cellular scheduling requests, and may predict the amount of resources required in the future will exceed the amount of available resources in the resource portion for Mode 1 Data and cellular PUSCH channel 814. As a result, the BS instructs the advanced UE to perform SL channel measurement on the Mode 2 resource pool at time 830. The BS provides a configurable measurement length 831 equal to one or multiple time periods of the Mode 2 pool during the SC period (k) 825.

In the meantime, the BS continues to assign resources from the Mode 1 SA portion and Mode 1 data zone/PUSCH portion to the advanced UE for sidelink message transmission, as illustrated in 850. During the sidelink message transmission 850, the subframes/time duration 832 used for transmitting sidelink SCI and data overlap with the instructed sidelink channel measurement period 831, and this area is used for sidelink transmission but not for measurement of Mode 2 resource pool. As such, sidelink message transmission always has higher priority than sidelink channel measurements.

After the measurement period, the UE feeds back SL channel measurement reports at time 833 to the base station via cellular uplink channel PUSCH.

Based on the reported SL channel measurements from the advanced UE, the BS identifies the Mode 2 resource pool especially the shared region (whole Data portion) is lightly loaded and not congested and decides to offload the advanced UE to the Mode 2 resource pool for the next sidelink message data TBs transmission 860. As shown for sidelink message transmission 860, the BS assigns the advanced UE resources 861 from the Mode 1 resource pool SA portion for transmitting SCI and indicates to the UE to utilise the shared region from the Mode 2 Data portion for transmitting data TBs.

The advanced UE then, based on past measurements, including SA decoding and energy sensing of Mode 2 resource pool usage, determines resources 862, 863 within the Mode 2 Data shared region for transmitting message data TBs. In such operation of cross-mode scheduling where control/scheduling information (SCI) is sent over a Mode 1 SA pool and its associated data TBs are transmitted over a Mode 2 Data pool (shared region), the resource pool where the control/scheduling information is sent is referred as the "host" pool 870 and the data resource pool where the shared region used is referred as the "guest" pool 880. Thus, host-guest relationship/association of the two different resource pools for control signalling and its associated data TB transmission is established for a sidelink message.

The principle in determining the appropriate Mode 2 SC period (guest Data pool) that is suitable for data TB transmission from the TX UE and subsequently data TB reception at RX UEs, shall be a Mode 2 Data resource portion that has two or more Transmit Time Intervals (TTIs) remaining in the Mode 2 Data pool from the end of the Mode 1 SA pool as shown by 891.

This ensures the same understanding of host SA pool and guest Data pool between the TX and RX UEs, allows still sufficient amount of transmission opportunities for two data TBs, and avoids excessive buffering for RX UEs, if overlapping or earlier (data before SA) TTIs are allowed.

For data reception at RX UEs, in general it takes about 1 TTI to process control signalling information before the UE is able to perform decoding of the associated data TBs. By following the above principle in determining the right Mode 2 SC period, there could be 3 sidelink message reception scenarios where RX UEs may need to buffer subframes of data at the start of the Mode 2 Data portion before the data TB decoding can begin.

With reference to region 891, where a Mode 1 SA portion is overlapping with a Mode 2 Data portion, RX UEs will need to buffer 1 TTI of data in the Mode 2 Data portion during SC Period (k) 825 from at the end of the Mode 1 SA portion during SC Period (n) 816.

With reference to region 892, if the gap between the end of the Mode 1 SA portion 813 during SC Period (n−2) 811 and the beginning of the Mode 2 Data portion 824 during SC Period (k−1) 821 is more than 1 TTI, in this case RX UEs will not need to buffer any data at the start of the Mode 2 data portion 824.

With reference to time 893, if there is no gap between the end of Mode 1 SA portion during SC Period (n+2) 818 and the beginning of Mode 2 Data portion during SC Period (k+2) 827, RX UEs will need to buffer 1 TTI of data at the start of the Mode 2 Data portion during SC Period (k+2) 827.

Figure 8:
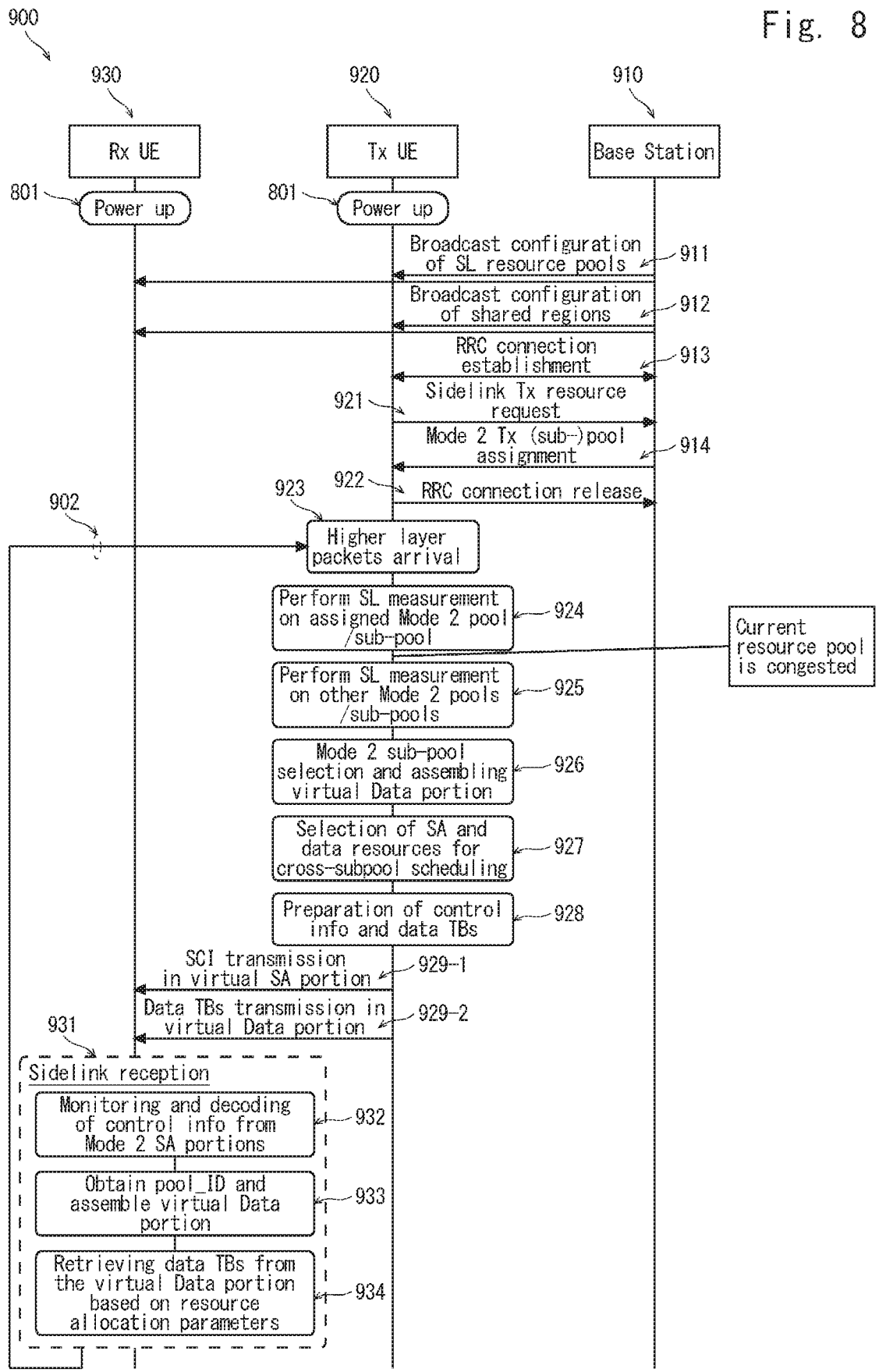
FIG. 8 illustrates a data communication method, according to an embodiment of the present invention.

FIG. 8 illustrates a data communication method 900, according to an embodiment of the present invention. The method 900 is for use at participating mode-2 sidelink communication UEs (i.e. TX UE and RX UE) to enable 'cross-subpool' scheduling which allows a TX UE to use an under-utilised configured secondary mode-2 resource sub-pool, which may be configured for used by other service. This enables the TX UE to offload traffic from its configured primary mode-2 resource sub-pool for immediate data transmission and reception, as required.

A base station may indicate to its mode-2 sidelink communication advanced UEs, the mode-2 enhanced resource pool structure with configured shared regions using the IEs discussed above. The shared regions of the mode 2 communication resources may be configured at a resource-pool or resource sub-pool level. The configured shared regions of the configured secondary mode-2 resource together with configured primary mode-2 resource form a virtual mode-2 resource for use which may be monitored, for available channel resource for further contention in SCI and data TB transmission, on demand or periodically, at a configurable interval.

On the aspect of contention for SCI and data TB transmission within available channel resource within a constructed virtual resource resulted from an observation, an advanced UE may further consider channel indexes within its primary resource pool/sub-pool region having higher priority for selection than channel indexes within its configured secondary resource pools/sub-pools region.

Furthermore, when channel indexes within its configured secondary resource pools/sub-pools region are considered for selection, an advanced-UE may treat all channel indexes within its configured secondary resource pools/sub-pools region in a constructed virtual resource pool with equal probability for selection regardless the pool/sub-pool the come from. This may therefore eliminate the case where congested traffic from its configured primary resource pool/sub-pool spills directly to the least congested configured secondary resource pool/sub-pool when channel selection is considered on physical/logical resource pool/sub-pool basis. When condition allows, a mode-2 TX UE may transmit one or both SA and associated data TBs in its originally assigned primary mode-2 resource pool or in shared secondary mode-2 resource pool to reduce or eliminate data collision on its designated primary mode-2 resource pool/sub-pool due to traffic growth.

The method 900 is described with reference to a cellular base station (BS) 910, an advanced UE performing sidelink message transmission (TX UE) 920 and a receiving UE (RX UE) 930 monitoring and decoding sidelink messages on mode-2 communication resource pool/sub-pools.

At step 801, both the TX and RX UEs power up, and request to participate in and be authorised for sidelink communication under network control. At the initial set up stage, both the TX and RX UEs receive and decode broadcast signalling from the local BS in step 911, about sidelink resource pools and sub-pools configuration information, where SIB-18 may be enhanced for use.

Both the UEs 920, 930 then receive further dedicated broadcast signalling from the BS, also via SIB, for the configuration information about the shared regions for mode 2 resource pool/sub-pools, at step 912. Since the TX UE intends to transmit messages using sidelink communication, the UE establishes RRC connection and requests for sidelink resources for transmission to the local BS 910 at steps 913 and 921, respectively. The BS assigns a mode 2 transmission resource pool/sub-pool at step 914.

The TX UE then releases the RRC connection with the BS at step 922, since sidelink resource selection does not require BS's assistance during mode-2 operation.

At step 923, a Media Access Control (MAC) layer at the TX UE receives message packets from its internal higher layer (e.g. originated from the application layer), calculates the total data TB size and determines the amount of data resource blocks (RBs) that would be required to transport the message in sidelink resource pool.

At step 924, the TX UE measures sidelink resource usage on a Mode 2 resource pool/sub-pool over both SA and Data portions that was designated by the BS in step 914. The measurement may be based on Block Error Rate (BLER) calculations from decoding SA and data TBs, sensing of energy level on SA and Data portion resources, or a combination of both to determine sidelink resource utilisation rate.

Since the TX UE MAC layer may regularly receive message packets from its higher layer, the sidelink channel measurement on the designated Mode-2 resource pool/sub-pool is carried out periodically.

Based on the measurement result/outcome, the TX UE determines whether its designated Mode-2 resource pool/sub-pool is congested and makes observation of unoccupied SA and Data portion resources that could potentially be used for its SCI and data TB transmission. If the designated pool/sub-pool is experiencing a high traffic volume, the UE performs sidelink channel measurement on other Mode-2 resource pools/sub-pools at step 925. The UE may need to monitor all Mode 2 pools and sub-pools with configured/preconfigured shared region(s) in order to make an appropriate selection.

At step 926, the TX UE then makes a selection of a Mode 2 pool/sub-pool (other than its designated one) with configured shared region and assembles a virtual resource pool if it is determined the message SCI is to be carried in one pool/sub-pool and some or all of the associated data TBs are in the selected pool/sub-pool. Hence, the virtual resource pool is a combination of the TX UE's designated pool (the host) plus the shared Data region(s) of the selected Mode 2 pool/sub-pool (the guest), thus forming the host-guest pool relationship/association. This virtual resource pool construction is further illustrated below with reference to FIG. 9.

At step 927, once the virtual resource pool for the message transmission has been constructed, the TX UE makes a selection of SA and data resources for cross-subpool scheduling, where an SA resource is to be selected from the virtual SA portion of the host pool and data resources are to be selected from the virtual data portion.

At step 928, the TX UE prepares SCI and data TBs for cross-mode scheduling, where the SCI contains the pool_ID of the selected Mode 2 pool/sub-pool in step 926 and resource allocation parameters are derived based on the constructed virtual Data portion.

At steps 929-1 and 929-2, the TX UE transmits message SCI using the selected resource from the virtual SA portion and the associated data TBs using the selected resources from the virtual Data portion of the constructed virtual resource pool.

For the RX UE 930, sidelink reception related functions 931 are provided in steps 932, 933 and 934.

At step 932, the RX UE continuously monitors SA resources and decodes SCI from SA portions of Mode 2 pool/sub-pools.

At step 933, based on the resource pool/sub-pool of the decoded SCI (host) and the obtained pool_ID (guest), the RX UE assembles the virtual resource pool. Then from the data resource allocation parameters, at step 934, the UE proceeds to retrieve the associated data TBs from the constructed virtual Data portion.

Steps 923 onwards are then repeated, as illustrated by 902, providing an iterative process.

Figure 9:
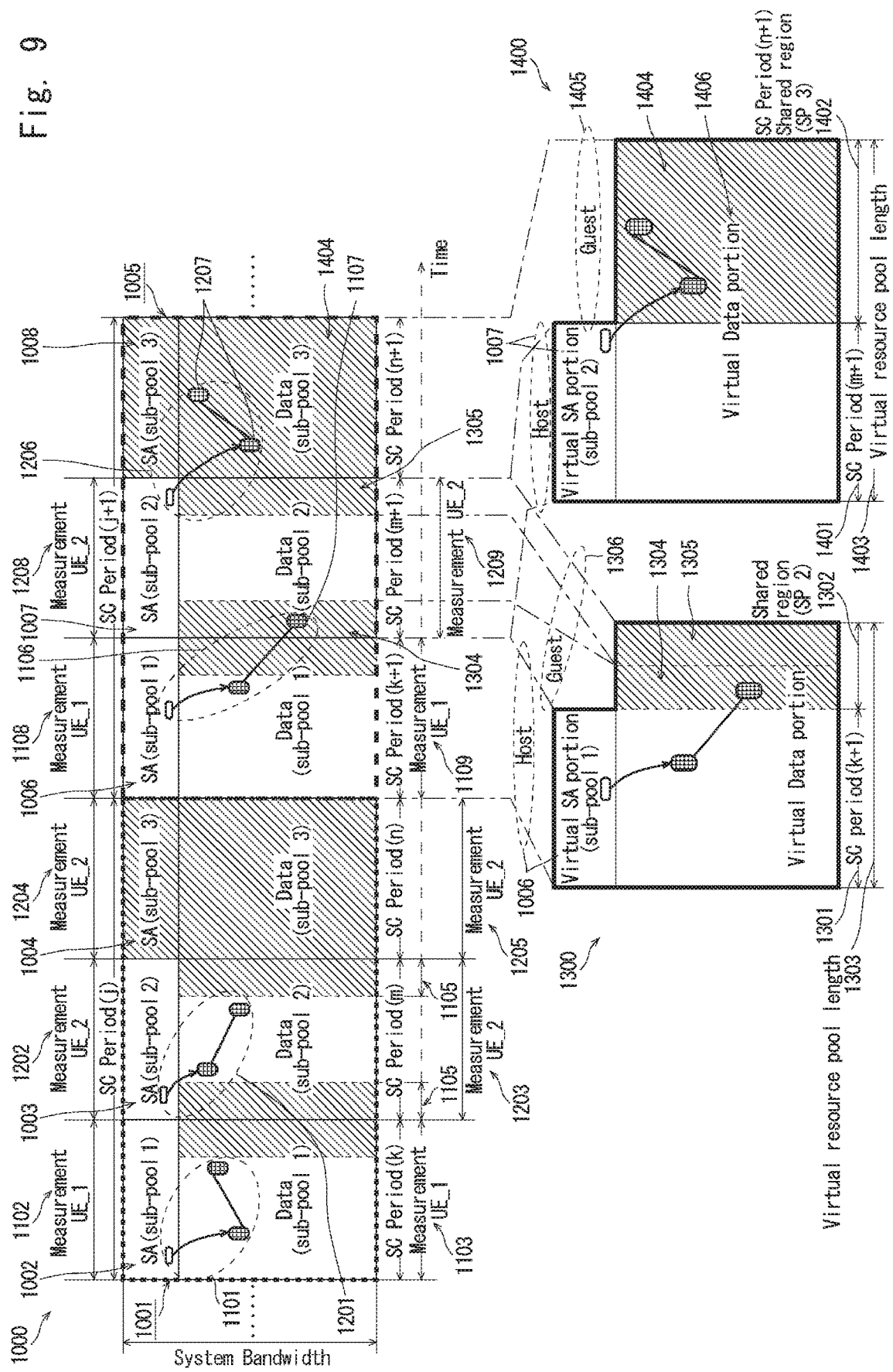
FIG. 9 illustrates a method of cross sub-pool sharing and scheduling, according to an embodiment of the present invention.

FIG. 9 illustrates a method 1000 of cross sub-pool sharing and scheduling, according to an embodiment of the present invention. The method 1000 is depicted for mode 2 UEs with cross-subpool scheduling and transmission.

A sidelink mode-2 resource super-pool 1001 that has been preconfigured or configured by cellular base station has a configurable length time duration and a configurable frequency size of system bandwidth, and repeats itself every SC period as shown by 1005 for SC Period (j+1). The mode-2 super-pool 1001 comprises three time division multiplexed sub-pools 1002, 1003, 1004, each with its own SC period and shared region(s) are individually configured/preconfigured.

For sub-pool 1 1002, SA and data resource portions are frequency multiplexed with one localised shared region being configured/preconfigured at the end of the data portion. This structure is repeated in 1006 within mode 2 super-pool SC Period (j+1).

For sub-pool 2 1003, SA and data resource portions are frequency multiplexed with two distributed shared regions being configured in the data portion. This structure is repeated in 1007 within mode 2 super-pool SC Period (j+1).

For sub-pool 3 (1004), SA and data resource portions are frequency multiplexed with both whole portions being configured/preconfigured as share regions. This structure is repeated in 1008 within mode 2 super-pool SC Period (j+1).

A first UE (UE_1) is an advanced UE that has been configured with the above mode-2 super-pool structure and shared regions have been assigned with sub-pool 1 as the designated mode-2 resource sub-pool for sidelink message transmission. The UE_1 transmits multiple sidelink messages 1101, 1106, each of which comprises an SCI block and two data TBs. The UE_1 may transmit the messages every Mode 2 super-pool SC period.

During the first message transmission 1101 in sub-pool 1, the first UE also performs sidelink channel measurements on both SA portion 1102 and Data portion 1103 of sub-pool 1 SC Period (k). Since the UE regularly needs to transmit sidelink messages, it performs the sidelink channel measurement periodically on the subsequent SA and Data portions 1108, 1109 of sub-pool 1 to monitor resource utilisation in the designated sub-pool.

During the sidelink channel measurement on the data portion of sub-pool 1 1103, the first UE may observe an increase in resource utilisation and experience a high traffic volume, and thus trigger sidelink channel measurement on the shared regions of the next data sub-pool 1105 to determines its resource utilisation rate.

Based on sidelink measurement results for 1103 and 1105 during SC Period (j), UE_1 decides to utilise the shared regions of sub-pool 2 Data portion for the second message transmission in the subsequent mode-2 super-pool SC Period (j+1). The second message transmission 1106 includes the second data TBs 1107 transmitted in the shared regions of Data sub-pool 2.

In order to utilise the shared regions of data sub-pool 2 for the second message transmission 1106, UE_1 first assembles a virtual resource pool by combining the original designated sub-pool 1 from SC Period (k+1) as host pool 1006 and shared regions of data sub-pool 2 1304 and 1305 of SC Period (m+1) as guest pool 1306. The virtual resource pool thus has a virtual resource pool length 1303 equal to the SC Period (k+1) 1301 plus the shared regions length of SC Period (m+1) 1302 as shown by 1300. Data resource selection and its resource allocation parameters (e.g. transmission pattern) shall then be based on the combined virtual data portion.

A second UE (UE_2), which is also an advanced UE being configured/preconfigured with the above mode-2 super-pool structure and shared regions has been assigned with sub-pool 2 as the designated mode-2 resource sub-pool for sidelink message transmission. Similar to UE_1, the UE_2 transmits multiple sidelink messages 1201, 1206, each of which comprises a SCI block and two data TBs. The messages 1201, 1206 are transmitted every Mode 2 super-pool SC period.

During the first message transmission 1201 in sub-pool 2, the second UE also performs sidelink channel measurements on both SA portion 1202 and Data portion 1203 of sub-pool 2 SC Period (m). Since the UE regularly needs to transmit sidelink messages, it performs the sidelink channel measurement periodically on the subsequent SA and Data portions 1208, 1209 of sub-pool 2 to monitor resource utilisation in the designated sub-pool. As part of the UE_2 subscribed services, it also monitors and receives messages being transmitted on mode 2 sub-pool 3 (e.g. for a vehicle UE where processing power consumption is not a significant concern). Hence, the UE may regularly perform sidelink channel measurement also on the shared regions 1204, 1205 of sub-pool 3, but the measurement frequency may be less compared to sub-pool 2.

During the mode 2 super-pool SC Period (j+1), UE_2 receives a late arrival of packets towards the end of its designated sub-pool 2 period. Based on sidelink measurement results for 1204 and 1205 on sub-pool 3, the UE decides to utilise the shared region of sub-pool 3 data portion for transmitting data TBs of the second message as shown by 1207.

In order to utilise the shared regions of data sub-pool 3 for the second message transmission 1206, UE_2 first assembles a virtual resource pool by combining the original designated sub-pool 2 from SC Period (m+1) as host pool 1007 and shared region of data sub-pool 3 1404 of SC Period (n+1) as guest pool 1405. The virtual resource pool hence has a virtual resource pool length 1403 equals to SC Period (m+1) 1401 plus the shared regions length of SC Period (n+1) 1402 as shown by 1400. Data resource selection and its resource allocation parameters (e.g. transmission pattern) shall then be based on the combined virtual Data portion.

Advantageously, embodiments of the present invention provide configurable region(s) of shared resources based on existing LTE based sidelink communication resource pool structure, which enables advanced sidelink transmitting devices to flexibly utilise under-utilised sidelink resources from other non-designated or secondary-designated resource pool(s)/sub-pool(s). This may be used to relieve or prevent congestion in a primary-designated sidelink communication resource and/or cellular communication resource, minimising the risk of inter-services transmission collisions where a common resource pool is allocated for sharing among multiple services and accommodate fast changing traffic demands or uneven demand of services within same cell (without having to reconfigure sidelink resources). As such, a required QoS and sidelink communication performance may be retained.

Embodiments of the present invention are provide an enhanced sidelink resource pool structure which is backward compatible, allowing the coexistence of legacy and advanced sidelink communication devices to operate at the same time in the same resource pool or resource sub-pool. In this regard, legacy sidelink communication devices may not have knowledge of additional configured information elements on configurable "shared regions" thus considering configured resource pool(s) or sub-pool(s) being indicated via legacy signalling as total available channel resources for contention in sidelink control and data TB transmission/reception. Furthermore, the additional configured information elements are designed for being decodable at advanced sidelink communication devices, indicating configurable secondary-designated channel resources for use when in needs or part(s) of total available channel resources for contention in addition to the configured primary-designated resource which is indicated via legacy signalling.

In the case of mode-2 or other autonomous mode sidelink communication where resource contention for sidelink control and data TBs transmission is done on individual basis, at an advanced sidelink communication device, a virtual resource pool or sub-pool being constructed from a primary-designated resource pool or sub-pool and 'shared regions' of one or more secondary-designated resource pools or sub-pools, may be considered as total periodic channel resource for being monitored. One or more channels in the available channel resources resulted from the observation may be further randomly decided for being used for sidelink and/or data TBs transmission and the advantage of this approach is to eliminate the congestion spilling from the most congested resource pool/sub-pool to the least congested resource pool/sub-pool when channel selection in done on logical resource pool or sub-pool basis.

In comparison to the existing sidelink resource pool structure design with repeated sidelink control period which is more suitable for periodic transmission of data messages, the enhanced structure with configurable shared region(s) and associated methods provide a mean for timely delivery of event triggered and delay-intolerant type road safety warning messages without having to postpone or delay a time sensitive data packets till next designated sidelink control period cycle.

Similarly, the enhanced resource pools with shared regions in other resource pools or sub-pools between two consecutive designated resource pools or sub-pools, allow late arrival packet to be sent immediately using shared region in other pool(s) or sub-pools hence reducing latency and easing the complexity of scheduling.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for use at an advanced wireless communication system supporting direct communication to provide flexible sharing of a resource pool, wherein the resource pool comprises one or more resource sub-pools, the resource sub-pool comprising a control region and a data region, the control region and the data region comprising a shared region and/or a fixed region, respectively, the method comprising:

assigning, by a base station, a first resource pool, a first resource for sidelink control information (SCI) from a control region of a first resource sub-pool, and a first resource for transmitting data from a data region of the first resource sub-pool to a first UE intending to the direct communication;

configuring, by the base station and to the first UE, a shared region which is included in a control region and a data region of one or more resource sub-pool included in the first resource pool;

measuring, at the first UE, utilization of a direct communication channel associated with a configured shared region;

selecting, by the first UE for transmitting data and based on the measured utilization, one or more resources for data from the first resource for transmitting data and a data shared region of one or more resource sub-pools to be measured for the utilization;

transmitting, in the first resource for SCI, by the first UE and to at least one second UE, sidelink control information (SCI) identifying a sub-resource pool which includes the resource for data selected by the first UE; and transmitting, by the first UE and to the at least one second UE, data associated with the SCI in the one or more selected resources for data.

2. The method of claim 1, wherein the shared regions are configured by a base station.

3. The method of claim 1, wherein the shared regions are configured by broadcast signaling.

4. The method of claim 1, wherein the shared regions are preconfigured.

5. The method of claim 1, wherein the SCI includes pool identifiers (pool_IDs) identifying both of first and second sub-pools or a pool identifier (pool_ID) identifying either of the first and second selected resource sub-pool.

6. The method of claim 1, wherein the first UE reports the measured utilization of the direct communication channel in a data region of the first resource pool and the measured utilization the direct communication channel in a data shared region of a second resource pool to the base station,
  in response thereto receives an indicator of the first resource pool or the second resource pool for transmission of the data, and
  selects a resource sub-pool used for transmitting data in a resource sub-pool indicated by the indication.

7. The method of claim 1, wherein the one or more resource sub-pool are time or frequency division multiplexed.

8. The method of claim 1, including forming a virtual resource pool using the first resource pool assigned by the base station and a data shared region of a second resource sub-pool selected by the first UE, and
  transmitting the SCI in a scheduling portion of the virtual resource pool and the data associated with the SCI in a data portion of the virtual resource pool.

* * * * *